United States Patent
Eun

(10) Patent No.: US 12,430,039 B2
(45) Date of Patent: Sep. 30, 2025

(54) STORAGE SYSTEMS INCLUDING A PLURALITY OF SOLID STATE DRIVES AND MANAGEMENT METHODS THEREOF

(71) Applicant: Samsung Electronics Co., Ltd., Suwon-si (KR)

(72) Inventor: Heeseok Eun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 18/076,616

(22) Filed: Dec. 7, 2022

(65) Prior Publication Data

US 2023/0418476 A1    Dec. 28, 2023

(30) Foreign Application Priority Data

Jun. 27, 2022   (KR) ................ 10-2022-0078020

(51) Int. Cl.
    *G06F 3/06* (2006.01)
(52) U.S. Cl.
    CPC ............ *G06F 3/0619* (2013.01); *G06F 3/065* (2013.01); *G06F 3/0653* (2013.01); *G06F 3/0679* (2013.01)
(58) Field of Classification Search
    USPC .............................. 711/12.103, 144
    See application file for complete search history.

(56) References Cited

U.S. PATENT DOCUMENTS

| | | | |
|---|---|---|---|
| 7,467,329 B1 | 12/2008 | Keeton et al. | |
| 8,977,804 B1* | 3/2015 | Horn ................ | G06F 11/008 711/114 |
| 9,785,364 B2 | 10/2017 | Iliadis et al. | |
| 10,409,683 B2* | 9/2019 | Ko ..................... | G06F 3/0619 |
| 10,452,289 B1 | 10/2019 | Colgrove et al. | |
| 10,552,062 B2 | 2/2020 | Ki | |
| 10,795,760 B2 | 10/2020 | Ki | |
| 11,029,891 B2 | 6/2021 | Surcouf et al. | |
| 11,275,652 B1 | 3/2022 | Danilov et al. | |
| 11,275,762 B2 | 3/2022 | Pitchumani et al. | |
| 2003/0204788 A1* | 10/2003 | Smith ................ | G06F 11/008 714/E11.144 |
| 2005/0283651 A1* | 12/2005 | Kikuchi ............ | G06F 11/1076 714/E11.034 |
| 2009/0292859 A1* | 11/2009 | Chu .................. | G06F 3/0688 711/E12.001 |
| 2013/0007097 A1* | 1/2013 | Sambe .............. | H04L 67/1097 709/203 |

(Continued)

*Primary Examiner* — Jared I Rutz
*Assistant Examiner* — Elias Young Kim
(74) *Attorney, Agent, or Firm* — Wolf, Greenfield & Sacks, P.C.

(57) ABSTRACT

Methods of operating storage systems that include a plurality of solid state drives, and the storage systems, are described. For example, a method may include, configuring the plurality of solid state drives into an erasure coding set for applying erasure coding, monitoring a reliability status of each of the plurality of solid state drives, selecting at least one solid state drive whose reliability status is lower than a reference value from among the plurality of solid state drives to exclude the at least one solid state drive from the erasure coding set, and constructing a replication set for applying data protection of a replication method by using the at least one solid state drive excluded from the erasure coding set.

16 Claims, 13 Drawing Sheets

(56) References Cited

U.S. PATENT DOCUMENTS

| | | | |
|---|---|---|---|
| 2013/0232289 A1* | 9/2013 | Zhong | G11C 16/3495 |
| | | | 711/102 |
| 2017/0147436 A1* | 5/2017 | Borlick | G11C 29/40 |
| 2018/0284997 A1* | 10/2018 | Dalmatov | G11C 16/349 |
| 2018/0321876 A1* | 11/2018 | Ballapuram | G06F 3/0619 |
| 2018/0343019 A1* | 11/2018 | Xiang | H03M 13/3761 |
| 2019/0272215 A1* | 9/2019 | Olarig | G06F 3/064 |
| 2020/0250032 A1 | 8/2020 | Goyal et al. | |
| 2020/0394113 A1* | 12/2020 | Gupta | G06F 3/0647 |
| 2020/0409590 A1* | 12/2020 | Gupta | G06F 3/0653 |
| 2021/0216398 A1 | 7/2021 | Davis et al. | |
| 2021/0311652 A1* | 10/2021 | Wang | G06F 3/0631 |

\* cited by examiner

| Device | Reliability Status | |
|---|---|---|
| | RL (Read Latency) | nRF (No. of Read Failure) |
| SSD_1 | x+α | 2 |
| SSD_2 | x | 0 |
| SSD_3 | x | 0 |
| SSD_4 | x+β | 4 |
| SSD_5 | x | 0 |
| SSD_6 | x | 0 |
| ... | ... | ... |
| SSD_12 | x | 0 |

| Device | EC(Erasure Coding) Mapping | REP(Replication) Mapping |
|---|---|---|
| SSD_1 | - | O |
| SSD_2 | O | - |
| SSD_3 | O | - |
| SSD_4 | - | O |
| SSD_5 | O | - |
| SSD_6 | O | - |
| ⋮ | ⋮ | ⋮ |
| SSD_m | O | - |

STORAGE SYSTEMS INCLUDING A PLURALITY OF SOLID STATE DRIVES AND MANAGEMENT METHODS THEREOF

CROSS-REFERENCE TO RELATED APPLICATION

This application claims priority under 35 U.S.C. § 119 to Korean Patent Application No. 10-2022-0078020 filed on Jun. 27, 2022, in the Korean Intellectual Property Office, and the entire contents of the above-identified application are incorporated by reference herein.

TECHNICAL FIELD

Aspects of the present disclosure relate to semiconductor memory devices, and more particularly, relate to storage systems that include a plurality of solid state drives (SSDs) and to methods of operating the same.

BACKGROUND

A solid state drive (hereinafter referred to as an SSD) may store user data in a nonvolatile storage medium, such as a flash memory device. Flash memory devices have specific read and write units and durability, and careful management of the flash memory devices may be employed to increase the durability thereof. Recently, with greatly increasing demand for SSDs, usages of SSDs are being diversified. For example, SSD usages may be subdivided into an SSD for a server, an SSD for a client, an SSD for a data center, and so on. It is desired that interfaces of the SSD be able to provide desired speed and reliability for their intended purposes.

Storage systems used in data centers or servers may require performance management in order to provide high quality of service as well as high data reliability. A plurality of SSDs may be mounted in such a storage system. In addition, RAID (Redundant Array of Independent Disks) or parity may be applied for fault tolerance or failure tolerance of the storage system. However, over time, each of the plurality of SSDs will have different wear leveling. In this case, when a fixed fault tolerance or failure tolerance method is applied, data reliability and service quality are inevitably deteriorated together. Accordingly, management methods for SSDs to maintain data reliability and service quality of a storage system are being considered.

SUMMARY

Aspects of the present disclosure provide storage systems capable of maintaining data reliability and performance of a plurality of SSDs and an operating method thereof.

According to some embodiments of the inventive concepts, a method of operating a storage system is provided. The storage system may include a plurality of solid state drives, and the method may include: configuring the plurality of solid state drives into an erasure coding set and applying erasure coding to the erasure coding set, monitoring a reliability status of each of the plurality of solid state drives, selecting, from among the plurality of solid state drives of the erasure coding set, at least one solid state drive having a reliability status that is lower than a threshold value and excluding the selected at least one solid state drive from the erasure coding set, and constructing a replication set that includes the at least one solid state drive excluded from the erasure coding set and applying a replication method of data protection to the replication set.

According to some embodiments of the inventive concepts, a storage system may include a plurality of solid state drives, and a system controller. The system controller may be configured to: group the plurality of solid state drives in sets and apply data protection to the sets, the sets including a first set in which an erasure coding method is applied to the solid state drives of the first set, and a second set in which a replication method is applied to the solid state drives of the second set, wherein the system controller is configured to monitor a reliability status of each of the plurality of solid state drives, and is configured to select at least one of the solid state drives of the first set having a reliability status that is lower than a reference value, exclude the selected at least one drive from the first set, and allocate the selected at least one solid state drive to the second set.

According to some embodiments of the inventive concepts, a method of operating a storage system may include: configuring a plurality of solid state drives into a first set and applying a first data protection policy to the first set, monitoring a reliability status of each of the plurality of solid state drives of the first set, selecting, from among the plurality of solid state drives of the first set, at least one solid state drive having a reliability status that is lower than a threshold value, and excluding the selected at least one solid state drive from the first set, and configuring a second set that includes the at least one selected solid state drive excluded from the first set and applying a second data protection policy to the second set.

BRIEF DESCRIPTION OF THE FIGURES

The above and other objects and features of the present disclosure will become apparent by describing in detail embodiments thereof with reference to the accompanying drawings.

FIG. 4 is a table showing the reliability status of each SSD configured in the device status monitor.

FIG. 5 is a table showing an example of allocation of data protection schemes of SSDs configured in the mapper of FIG. 3.

DETAILED DESCRIPTION

It is to be understood that both the foregoing summary section and the following detailed description provide merely some example embodiments of the present inventive concepts, and it is to be considered that description of other embodiments the claimed inventive concepts is also provided herein. Reference signs are indicated for example embodiments of the present inventive concepts, which are shown in the accompanying drawings. Wherever possible, the same reference numbers are used in the description and drawings to refer to the same or like parts.

Hereinafter, a NAND flash memory will be used as an example of a semiconductor memory device for describing the features and functions of the present inventive concepts. However, those skilled in the art will readily appreciate other features and functions of the present inventive concepts in accordance with the teachings herein. The present inventive concepts may be implemented or applied through other embodiments. Various advantages and capabilities are described herein and/or will be apparent to those of skill in the art. Moreover, the detailed description may be modified or changed according to the usage or application of the present inventive concepts, without departing significantly from the scope, spirit and other objects of the present inventive concepts.

Figure 1:
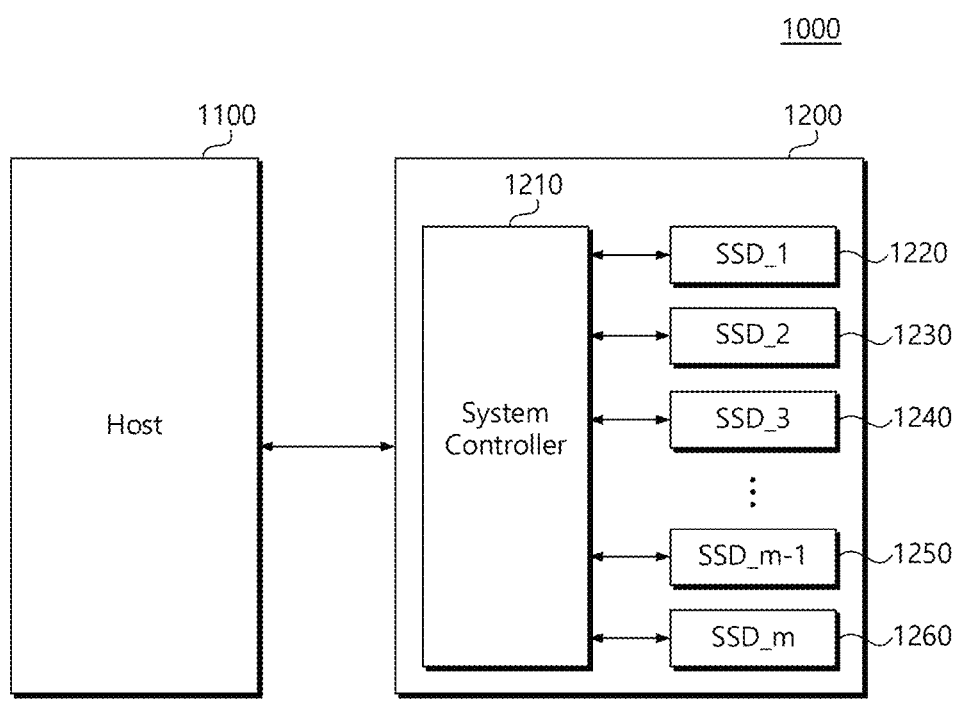
FIG. 1 is a block diagram schematically showing a system according to an example embodiment of the present inventive concepts.

FIG. 1 is a block diagram schematically showing a system according to an embodiment of the present inventive concepts. Referring to FIG. 1, a system 1000 may include a host 1100 and a storage system 1200. The system 1000 may be, for example, a server or a data center.

The host 1100 may store various user data in the storage system 1200. The host 1100 accesses the storage system 1200 to update or read stored data. For example, the host 1100 may include at least one processor. The host 1100 may be a processor itself, an electronic device including a processor, or a management device of a data center or server. The host 1100 may be a server or another system constituting a data center or a client.

The storage system 1200 may include a system controller 1210 and a plurality of SSDs 1220, 1230, 1240, 1250, and 1260. For example, there may be m SSDs, where m is a natural number greater than or equal to two. The system controller 1210 may interface the plurality of SSDs 1220, 1230, 1240, 1250, and 1260 with the host 1100. For example, the system controller 1210 may provide a communication channel with the host 1100. The system controller 1210 may provide a physical connection between the host 1100 and the storage system 1200. That is, the system controller 1210 may provide an interface or interfacing with the storage system 1200 e.g., to a network interface or communication interface of the host 1100. For example, the network interface or communication interface of the host 1100 may include at least one of USB (Universal Serial Bus), SCSI (Small Computer System Interface), PCI express, ATA, PATA (Parallel ATA), SATA (Serial ATA), SAS (Serial Attached SCSI), UFS (Universal Flash Storage), Fiber Channel (FC) based NVMeoF, Ethernet, Infiniband, RoCE, and/or iWARF, but the present disclosure is not limited to these examples.

The system controller 1210 may monitor the reliability of the plurality of SSDs 1220, 1230, 1240, 1250, and 1260, and may select a data protection method according to the monitoring result. For example, a parity method or a replication method may be used as the data protection method. The parity method may include RAID5 or RAID6 using data exclusive-or (XOR) parity, or erasure coding in which at least one parity symbol is generated by encoding in units of symbols. The replication method may be a method of copying one data unit and storing it in a plurality of SSDs. The replication method may include RAID1 in which the original data and one copy are stored on different SSDs, or the original and two or more copies are stored on different SSDs.

In the present inventive concepts, for convenience of description, a replication method using one original and two copies and a parity method using erasure coding will be described as representative data protection methods. However, the disclosure of the present inventive concepts is not limited thereto, and it will be well understood that various data protection methods may be set based on the reliability of each of the plurality of SSDs 1220, 1230, 1240, 1250, 1260.

The plurality of SSDs 1220, 1230, 1240, 1250, and 1260 may each include an SSD controller (not shown) and a plurality of flash memory devices (not shown). Each of the plurality of SSDs 1220, 1230, 1240, 1250, and 1260 may perform operations such as address mapping, wear leveling, and error correction in a controller layer provided therein.

Although RAID1, RAID5 and RAID6 are discussed above, RAID (Redundant Array of Independent Disks) may be defined according to various levels which may be used in the present inventive concepts. For example, the present inventive concepts may be implemented using one or more of RAID level 0 (Striped set without parity or Striping), RAID level 1 (Mirrored set without parity or Mirroring), RAID level 2 (Hamming code parity), RAID level 3 (Striped set with dedicated parity, bit interleaved parity, or byte level parity), RAID level 4 (Block level parity), RAID level 5 (Striped set with distributed parity or interleave parity), RAID level 6 (Striped set with dual distributed parity), RAID level 7, RAID level 10, and/or implementations using merged or nested RAID levels, such as RAID level 53.

When a replication method is used as the data protection method for the plurality of SSDs 1220, 1230, 1240, 1250 and 1260, the efficiency of the storage space may decrease, but performance (e.g., response speed) may increase. On the other hand, when erasing coding is applied as the data protection method, the efficiency of the storage space may be increased, but the performance may be significantly degraded in an SSD that has been severely deteriorated. However, according to the storage system 1200 of the present inventive concepts, the reliability status of each of the plurality of SSDs 1220, 1230, 1240, 1250, 1260 may be monitored through reliability monitoring, and the replication method and the erasure coding method are changed or adjusted dynamically according to the result.

The system controller 1210 of the present inventive concepts may manage SSDs having a reliability status equal to or higher than a threshold or state (e.g., a "good" reliability status) by the erasure coding method, and may manage SSDs having a reliability status lower than the threshold or state by the replication method. Accordingly, reliability and storage space efficiency can be ensured while maintaining the performance of the storage system 1200 above a certain level.

Figure 2:
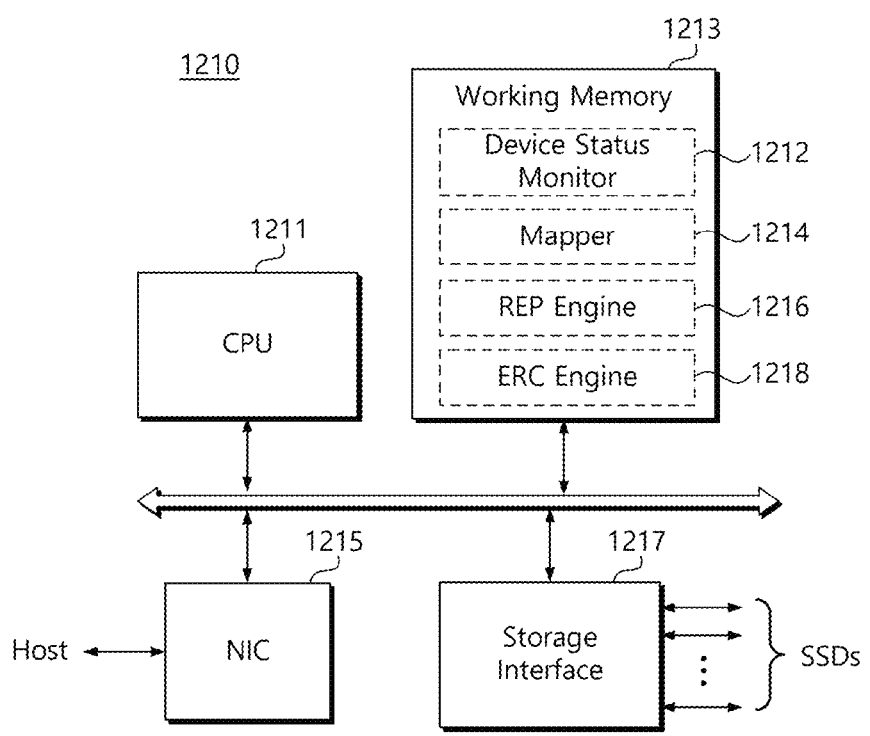
FIG. 2 is a block diagram showing an example embodiment of the system controller of FIG. 1.

FIG. 2 is a block diagram exemplarily showing the system controller 1210 of FIG. 1. Referring to FIG. 2, the system controller 1210 of the present inventive concepts may include a central processing unit (CPU, 1211), a working memory 1213, a network interface card (NIC, 1215), and a storage interface 1217.

The CPU 1211 may transfer various control information used for read/write operations for the plurality of SSDs 1220, 1230, 1240, 1250, 1260 to registers of the storage interface 1217. The CPU 1211 may operate according to software or applications provided for various control operations of the system controller 1210. For example, the CPU 1211 may perform a data protection function for managing the plurality of SSDs 1220, 1230, 1240, 1250, and 1260. To this end, the CPU 1211 may execute applications such as the device status monitor 1212 and the mapper 1214, which may be loaded in the working memory 1213.

The working memory 1213 may be used as an operating memory, a cache memory, or a buffer memory of the CPU 1211. The working memory 1213 may store codes and instructions executed by the CPU 1211. The working memory 1213 may store data processed by the CPU 1211. In some embodiments, the working memory 1213 may be implemented as a static RAM (SRAM). The working memory 1213 may be loaded with software or applications, such as the device status monitor 1212, the mapper 1214, a replication engine 1216, and an erasure coding engine 1218.

As the device status monitor 1212 is executed by the CPU 1211, the system controller 1210 may monitor the reliability of each of the plurality of SSDs 1220, 1230, 1240, 1250, 1260 in real time or periodically. That is, by driving or operating the device status monitor 1212, the system controller 1210 may recognize whether a read latency is longer than a reference value or threshold value during a read operation on any one SSD. Alternatively, by driving or operating the device status monitor 1212, the system controller 1210 may count the number of read failures for any one SSD, and determine whether the counted number exceeds a reference value or threshold value.

Reliability status information of each of the plurality of SSDs 1220, 1230, 1240, 1250, and 1260 may be managed in the form of a table by the device status monitor 1212. In addition, the mapper 1214 may maintain or change the data protection method of each of the plurality of SSDs 1220, 1230, 1240, 1250, and 1260 based on the monitored reliability status. For example, the mapper 1214 may initially manage the data protection method of all of the plurality of SSDs 1220, 1230, 1240, 1250, and 1260 using the erasure coding method. However, when it is determined that one or more SSDs has a reliability that is reduced below a specific reference value or threshold value, the mapper 1214 may separate the SSDs into a separate group or separate groups, and manage the SSDs having reduced reliability in the replication method.

The replication engine 1216 may manage the SSDs allocated by the mapper 1214 to a replication method (e.g., RAID1). For example, when the number of SSDs allocated to the replication method meets a predetermined number, the replication engine 1216 may manage the allocated SSDs and store original data and copy data in the allocated SSDs. For example, the replication engine 1216 may store one original data and two copy data (or chunks) in the allocated SSDs. On the other hand, the erasure coding engine 1218 may manage data input/output to SSDs allocated to the erasure coding method by applying erasure coding, which in some embodiments may be all SSDs that are not allocated to the replication method. That is, the erasure coding engine 1218 may divide write-requested data into a plurality of symbols, and may encode the divided symbols by erasure coding to generate at least one parity symbol. The erasure coding engine 1218 may divide and store each of the data symbols and the parity symbols in a plurality of SSDs. During a read operation, error correction or data recovery may be possible through a decoding procedure of the erasure coding.

The network interface card 1215 may provide a communication interface for communicating with the outside of the storage system 1200. For example, the network interface card 1215 may be an Ethernet switch or a communication interface for connecting an Ethernet fabric with the storage system 1200.

The storage interface 1217 may provide an interface or interfacing with the plurality of SSDs 1220, 1230, 1240, 1250, 1260. The storage interface 1217 may write data transferred to at least one of the plurality of SSDs 1220, 1230, 1240, 1250, and 1260 to the selected SSD via respective channels.

The system controller 1210 described above may dynamically manage a data protection method based on the reliability status of each of the plurality of SSDs 1220, 1230, 1240, 1250, 1260. For example, the system controller 1210 may change to one of a replication method or an erasure coding method based on the reliability status or reliability status information of each of the plurality of SSDs 1220, 1230, 1240, 1250, 1260. Accordingly, data reliability can be maintained while reducing performance degradation caused by deterioration of the SSD.

In some embodiments, the device status monitor 1212, the mapper 1214, the replication engine 1216, and the erasure coding engine 1218 may be provided in the form of software as described above, and/or may be implemented as hardware (e.g., separate hardware) and/or firmware.

Figure 3:
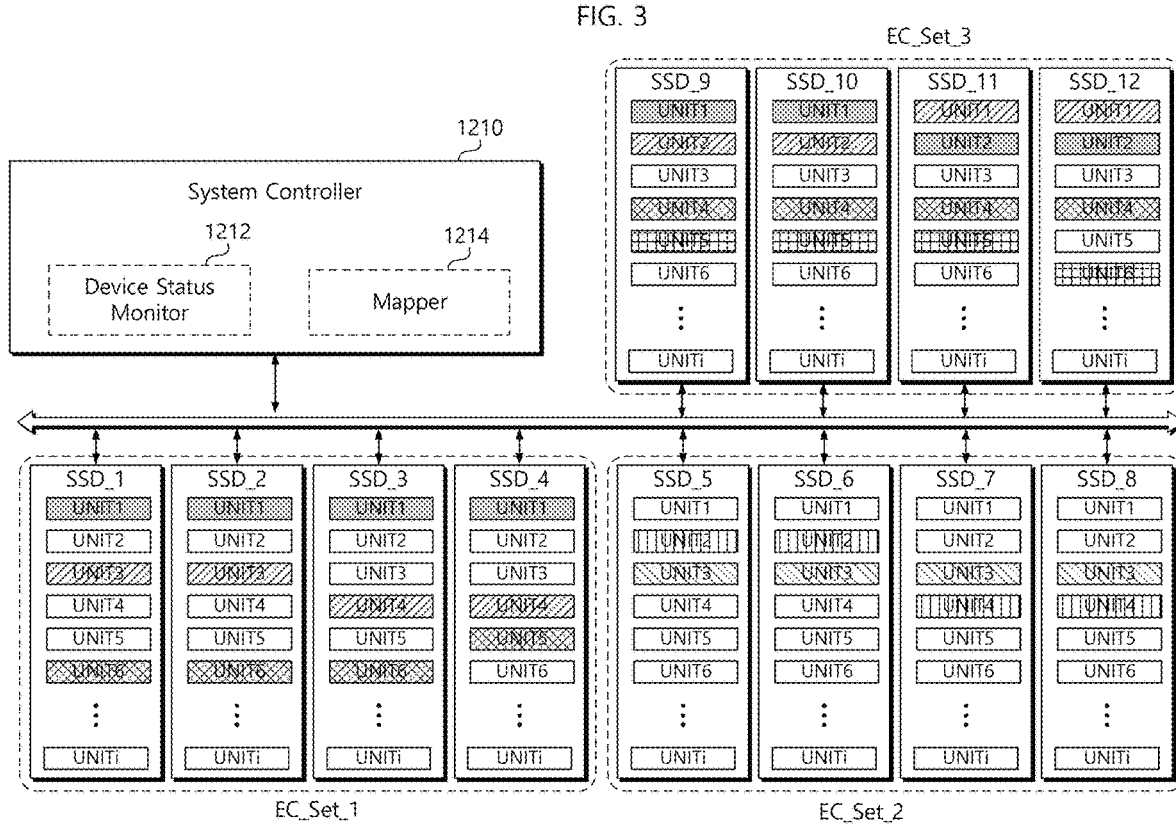
FIG. 3 is a diagram exemplarily showing the operation of the device status monitor and mapper of the present inventive concepts.

FIG. 3 is a diagram showing an example of an operation of the device status monitor 1212 and mapper 1214 of the present inventive concepts. Referring to FIG. 3, the mapper 1214 may manage all SSDs using the erasure coding (EC) method until a reliability degradation is detected by the device status monitor 1212. For convenience of description, it is assumed that 12 SSDs (e.g., SSD_1 to SSD_12) are included in the storage system 1200, with the understanding that the present disclosure is not limited thereto.

The mapper 1214 may apply an erasure coding (EC) method as a default setting of the data protection method. For example, one data may be divided into three data symbols by erasure encoding, and one parity symbol may be generated from the three data symbols. The four symbols generated in this way are stored separately in four SSDs, or in other words the four symbols are generated in a respective one of four different SSDs. When the erasure coding (EC) method is applied in this way, the 12 SSDs (SSD_1 to SSD_12) may be grouped into three erasure coding sets (EC_Set_1, EC_Set_2, EC_Set_3).

The first erasure coding set EC_Set_1 may include four SSDs (SSD_1 to SSD_4). For example, when a write request occurs, the data requested to be written may be encoded into four symbols (or chunks) through erasure encoding. Subsequently, the four symbols or chunks may be distributed and written in each of the first units UNIT1 of the SSD_1 to SSD_4. The four symbols may together form one stripe. In some embodiments, unit allocation of the four SSDs of the first erasure coding set EC_Set_1 (i.e., SSD_1 to SSD_4) to form one stripe may be randomly processed or performed. That is, a certain stripe may include the second unit UNIT3 of the SSD_1 to SSD_2 and the fourth unit UNIT4 of the SSD_3 to SSD_4. As another example, the stripe may include a sixth unit UNIT6 of the SSD_1 to SSD_3 and a fifth unit UNIT5 of the SSD_4. One unit may be, for example, a unit of a flash memory device of SSD, a unit of a memory block, and a unit of a page. However, it will be understood that the present disclosure is not limited thereto.

The second erasure coding set EC_Set_2 may include four SSDs (SSD_5 to SSD_8). When the write request occurs, write-requested data may be encoded into four symbols (or chunks) through erasure encoding, and the four symbols may be distributed and stored in units of units in each of the SSD_5 to SSD_8. Again, four symbols may form one stripe. A configuration method of the second erasure coding set EC_Set_2 may be applied to the SSD_5 to SSD_8 that is similar or substantially the same as the first erase coding set EC_Set_1 described above. A configuration method of the third erasure coding set (EC_Set_3) may be applied to the four SSDs (SSD_9 to SSD_12) that is similar or substantially the same as the first erase coding set (EC_Set_1) described above.

The mapper 1214 may periodically update the address mapping for managing the above-described three erasure coding sets (EC_Set_1, EC_Set_2, EC_Set_3). For example, the mapper 1214 may adjust the mapping to store a new stripe within an erasure coding set. As another example, the mapper 1214 may adjust the mapping to remove a stripe after the stripe data is erased. Furthermore, the mapper 1214 may adjust the mapping to an already-existing erasure coding set after either stripe data is erased or modified.

However, the SSD allocation of each of the initially set erasure coding sets (EC_Set_1, EC_Set_2, EC_Set_3) may be changed when a change in reliability of the SSDs (SSD_1 to SSD_12) is detected by the device status monitor 1212. That is, if it is detected that the read latency or the number of read failures among the SSDs (SSD_1 to SSD_12) increases above a reference or threshold value, the corresponding SSD may be excluded from the erasure coding set, and new erasure coding sets must be configured. This procedure will be described in more detail with reference to the drawings to be described later.

FIG. 4 is a table showing a reliability status (e.g., a reliability status indicator or value) of each SSD configured in the device status monitor. Referring to FIG. 4, the device status monitor 1212 may monitor reliability changes for all SSDs (e.g., SSD_1 to SSD_12) in the storage system 1200, and may configure and updates the reliability status table 1212a.

The reliability status may be monitored for each of the SSDs (e.g., SSD_1 to SSD_12). For example, a read latency RL or a read failure count nRF may be used as a reliability status for each of the SSDs (e.g., SSD_1 to SSD_12). However, in some embodiments, various parameters other than the read latency RL or the number of read failures nRF may be used for the reliability status of each of the SSDs. For example, the reliability status may be defined based on an average wear leveling value or the number of reads of blocks constituting the SSD.

In some embodiments, the read latency RL or the number of read failures nRF will be used as a parameter indicating the reliability status. The read latency RL may represent a time taken for each of the SSDs to respond to a read request by the system controller 1210. For example, it may be assumed that a normal read latency RL value is 'x'. When an access operation to one or more of the SSDs in the storage system 1200 occurs, the device status monitor 1212 may check the read latency RL for each of the accessed SSDs (e.g., SSD_1 to SSD_12). Then, the checked read latency value may be updated in the reliability status table 1212a managed by the device status monitor 1212.

For example, when an access to a first SSD (e.g., 'SSD_1') occurs, the device status monitor 1212 may measure the size of read latency from the time when the read request is transmitted to the time when read data or a response is generated. As shown, the read latency RL measured in the first SSD ('SSD_1') may be expressed as 'x+a'. Also, it can be seen that the read latency RL measured in a different SSD (e.g., a fourth SSD or 'SSD_4') may be measured as 'x+β'. This may be due to a decrease in data reliability due to internal degradation of the first SSD 'SSD_1' or the fourth SSD 'SSD_4', or an increase in error bits. On the other hand, the read latency RL of the SSDs SSD_2, SSD_3, SSD_5, SSD_6, and SSD_12 might not have increased from the nominal or normal value 'x'.

As another parameter indicating the reliability status, the number of read failures nRF may be used. The number of read failures nRF may indicate the number of failures in which each of the SSDs (SSD_1 to SSD_12) fails to resolve with its own defense code or error correction engine in response to a read request by the system controller 1210. When the read failure occurs, a data recovery function in the storage system 1200 may be activated. A read failure in an SSD may be due to a decrease in reliability caused by an increase in wear level or an increase in deterioration of the SSD.

In a normal case, it may be assumed that the number of read failures nRF of the SSD is '0'. When an access operation to the SSDs (e.g., one or more of the SSDs SSD_1 to SSD_12) in the storage system 1200 occurs, the device status monitor 1212 may monitor whether the read failure occurs for each accessed SSD. In addition, the monitored read failure count nRF may be updated in the reliability status table 1212a managed by the device status monitor 1212.

As seen in the example of FIG. 4, the number of read failures nRF of some of the SSDs (SSD_2, SSD_3, SSD_5, SSD_6, SSD_12) may still appear as '0', but in 'SSD_1' and 'SSD_4', the number of read failures nRF may be 2 and 4, respectively. This increased number of read failures nRF may be due to a decrease in data reliability due to internal degradation of 'SSD_1' or 'SSD_4', or an increase in error bits.

FIG. 5 is a table showing an example of allocation of data protection methods of SSDs configured in the mapper of FIG. 3. FIG. 5 continues using the example discussed with reference to FIG. 4. Referring to FIG. 5, the mapper 1214 may change a data protection method according to a change in reliability of all SSDs (e.g., SSD_1 to SSD_12) in the storage system 1200. That is, the mapper 1214 may select one of the replication REP method and the erasing coding EC method according to the reliability status of each of the SSDs (SSD_1 to SSD_12). The allocation table 1214a may be configured for the operation of the mapper 1214.

Based on the example reliability statuses described with reference to FIG. 4, the mapper 1214 may set a data protection method of each of the SSDs (SSD_1 to SSD_12). For example, as described herein the mapper 1214 may determine the data protection method based on the number of read failures nRF. The number of read failures nRF of the SSDs (SSD_2, SSD_3, SSD_5, SSD_6, SSD_12) was '0', and the number of read failures nRF of the SSD_1 and SSD_4 were '2' and '4', respectively. Therefore, if the mapping policy of the mapper 1214 is to assign to the replication REP method SSDs having a reliability status indicating a number of read failures nRF of '2' or more, then the data protection method of 'SSD_1' and 'SSD_4' will be assigned with a mapping corresponding to the replication REP method. On the other hand, the data protection method of the other SSDs (e.g., SSD_2, SSD_3, SSD_5, SSD_6, and SSD_12) may be maintaining with a mapping corresponding to the initially allocated erasure coding EC method.

Allocation or mapping of a data protection method for each of the SSDs may be changed according to a change in reliability status of each of the SSDs (SSD_1 to SSD_12).

Figure 6:
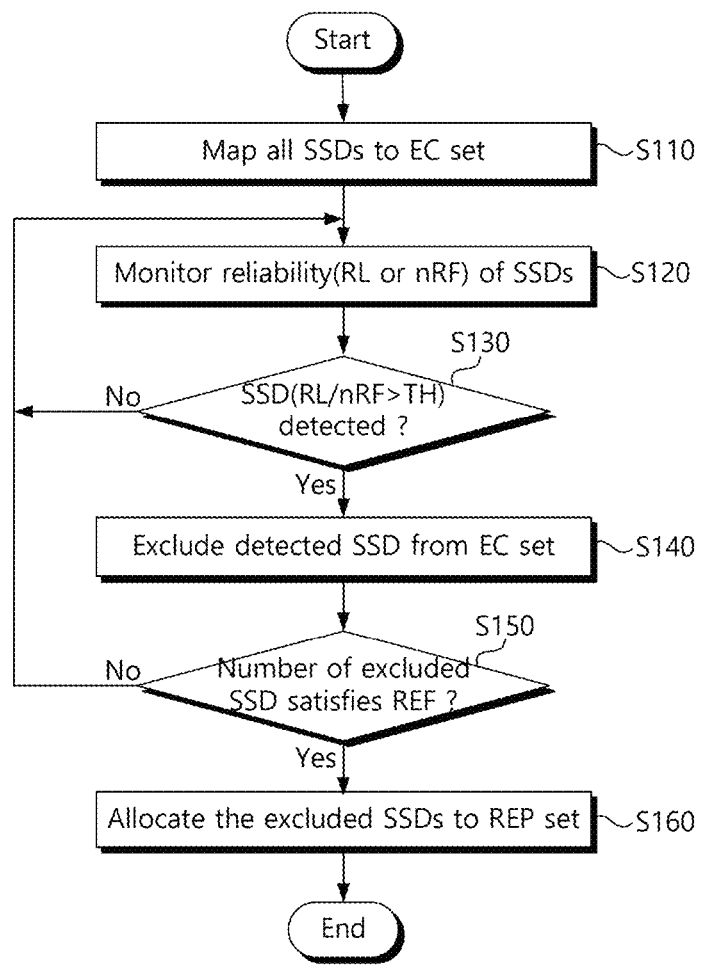
FIG. 6 is a flowchart schematically illustrating a method of changing a dynamic data protection scheme performed in the storage system of the present inventive concepts.

FIG. 6 is a flowchart schematically illustrating a method of changing a dynamic data protection method performed in the storage system of the present inventive concepts. Referring to FIG. 6, the storage system 1200 may change the data protection method of each of the SSDs (e.g., SSD_1 to SSD_12) according to the reliability status of each respective SSD.

In operation S110, the storage system 1200 may map data protection methods of all SSDs of the storage system (e.g., SSD_1 to SSD_12) to an erasure coding EC method. That is, the erasure coding EC may be set as a default data protection method of each of the SSDs (SSD_1 to SSD_12).

In operation S120, the device status monitor 1212 (refer to FIG. 3) of the system controller 1210 (refer to FIG. 3) may check and/or update the reliability status of one or more accessed SSDs when an access operation to one or more of a plurality of SSDs (SSD_1 to SSD_12) occurs. That is, the device status monitor 1212 may check the read latency RL and/or the number of read failures nRF.

In operation S130, an operation branch may occur depending on whether there is an SSD having a checked read latency RL or a number of read failure nRF that exceeds a reference value or threshold value TH. If there is one or more SSDs that is detected having a read latency RL and/or a number of read failures nRF exceeding reference value or threshold value TH ('Yes' direction), the procedure may move to operation S140. On the other hand, if an SSD is not identified as having the read latency RL and/or the number of read failures nRF that exceeds the reference value or threshold value TH ('No' direction), the procedure returns to operation S120. In some embodiments, different reference values or threshold values TH may be used for the read latency RL and the number of read failures nRF.

In operation S140, the mapper 1214 may change the data protection method of the one or more SSDs in which the read latency RL or the number of read failures nRF exceeds the reference value TH. For example, the mapper 1214 may exclude the detected SSDs from the erasure coding EC set.

In operation S150, the mapper 1214 may determine whether the number of SSDs excluded from the erasure coding EC set satisfies a specific number REF. If the number of SSDs excluded from the erasure coding EC set satisfies the specific number REF ('Yes' direction), the procedure moves to operation S160. On the other hand, if the number of SSDs excluded from the erasure coding EC set does not satisfy a certain number REF ('No' direction), the procedure returns to operation S120 to continue monitoring the read latency RL or the number of read failures nRF.

In operation S160, the mapper 1214 may allocate the SSDs excluded from the erasure coding (EC) set as a replication REP set. Thereafter, data newly written to the SSDs allocated to the replication REP set will be managed by the data protection scheme of the replication REP method.

In the above, examples of reliability status monitoring by the device status monitor 1212 and the mapper 1214 of the storage system 1200 and a method of changing the data protection method using the result have been described. Through the above-described method, the system controller 1210 may dynamically manage the replication method or the erasure coding method based on the reliability status of each of the plurality of SSDs. Accordingly, it may be possible to maintain data reliability while reducing performance degradation caused by wear leveling or an increase in deterioration of an SSD.

Figure 7:
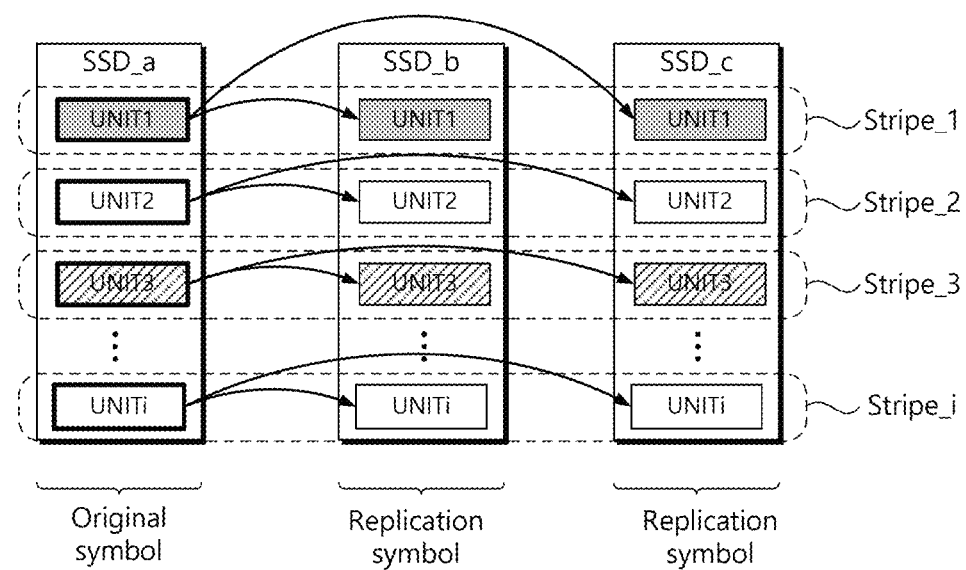
FIG. 7 is a diagram illustrating an example of a replication (REP) scheme among data protection schemes of the present inventive concepts.

FIG. 7 is a diagram exemplarily illustrating the replication REP method among data protection methods of the present inventive concepts. Referring to FIG. 7, when three SSDs (e.g., SSD_a, SSD_b, and SSD_c) are allocated as a replication set (REP set), an original symbol may be stored in a first solid state drive SSD_a, and the duplicated two symbols may be stored on the remaining two solid state drives (e.g., second and third SSDs SSD_b, SSD_c) of the replication REP set.

When write data is provided to the three SSDs (SSD_a, SSD_b, and SSD_c) designated as a replication REP set, the system controller 1210 may configure and/or generate an original symbol and two replication symbols. In addition, each symbol may be written in each unit UNIT1 of the SSDs SSD_a, SSD_b, and SSD_c. In this case, even if any one of the data constituting the stripe_1 is lost later, complete restoration may be possible. In the same manner, each of the remaining stripes (Stripe_2, Stripe_3, . . . , Stripe_i) may also store write-requested data composed of an original symbol and two replication symbols.

Figure 8:
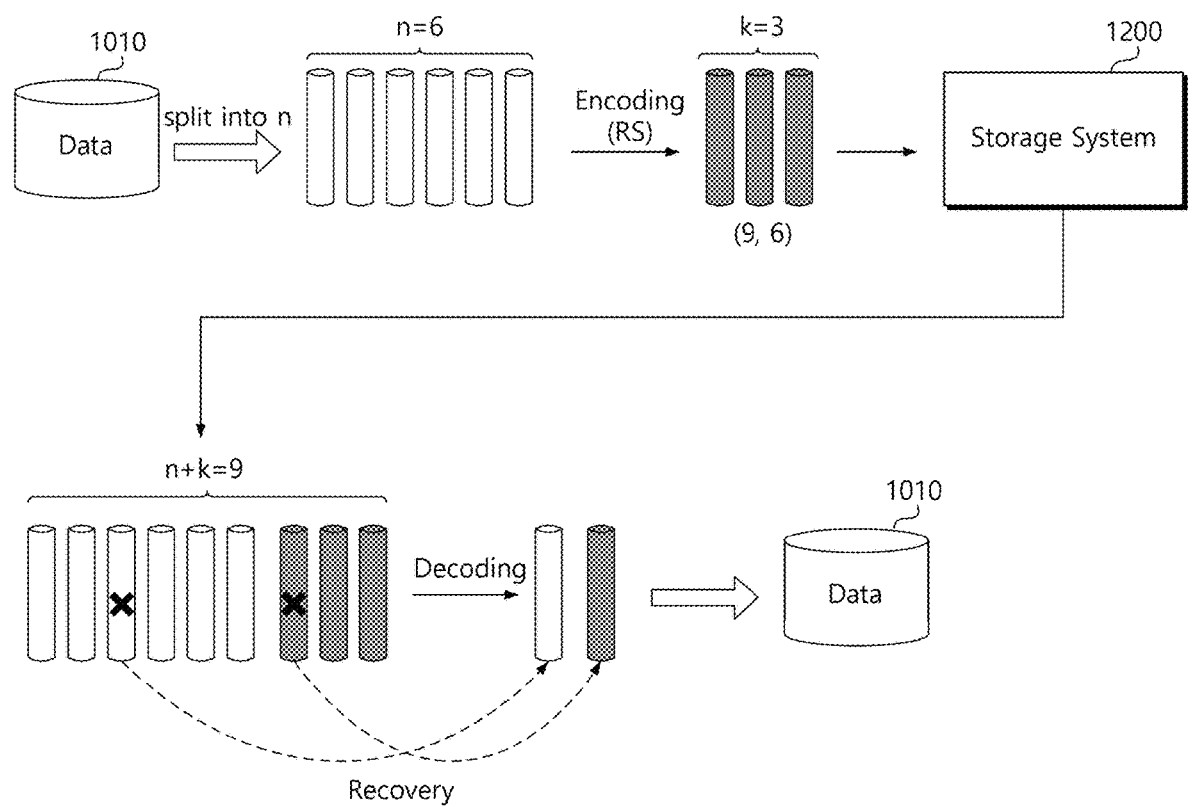
FIG. 8 is a diagram illustrating an example of an erasure coding (EC) scheme among data protection schemes of the present inventive concepts.

FIG. 8 is a diagram illustrating an example of an erasure coding EC method among data protection methods of the present inventive concepts. Referring to FIG. 8, write-requested data 1010 may be encoded using an erasure coding method and stored in the storage system 1200, and when a read request occurs, it may be decoded and output as data 1010.

The write-requested data 1010 may be divided into a plurality of 'n' symbol units, and 'k' parity symbols may be generated by encoding. In addition, 'n+k' symbols are allocated to and stored in 'n+k' SSDs of the storage system 1200. If a read request is provided, 'n+k' symbols read from different SSDs may be recovered by erasure decoding if there is an error.

Figure 9:
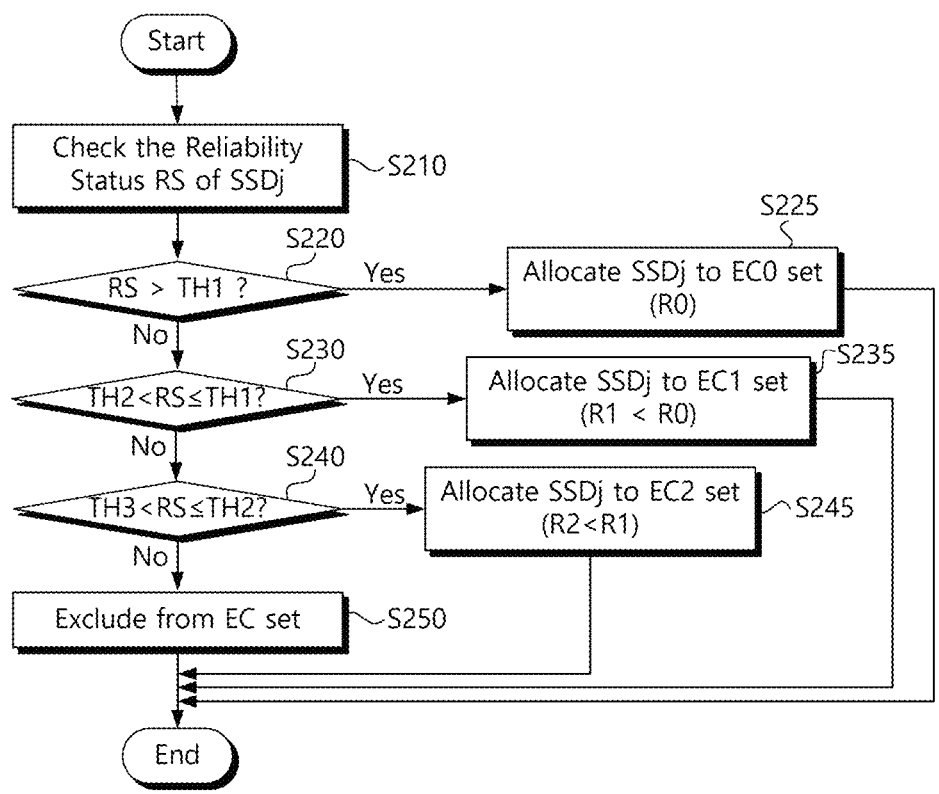
FIG. 9 is a flowchart illustrating an example method of applying erasure coding (EC) according to an example embodiment of the present inventive concepts.

FIG. 9 is a flowchart showing an example method of applying multi-layer erasure coding (Multi-Layer EC) according to some embodiments of the present inventive concepts. Referring to FIG. 9, any one SSD may be allocated to any one of a plurality of erasure coding sets (EC Sets) having different code rates. That is, any one solid state drive SSDj may be allocated to the erasure coding set EC corresponding to different code rates or data lengths according to the degree of the detected reliability status RS.

In operation S210, the system controller 1210 (refer to FIG. 3) may check the reliability status RS of any one solid state drive SSDj. The reliability status RS may be the read latency RL or the number of read failures nRF. However, the degree of the reliability status RS may be identified based on a comparison with a plurality of threshold values TH1, TH2, and TH3.

In operation S220, the device status monitor 1212 (refer to FIG. 3) may determine whether the detected reliability status RS of the solid state drive SSDj is greater than a first threshold value TH1. If the reliability status RS of the solid state drive SSDj is greater than the first threshold value TH1 ('Yes' direction), the procedure moves to operation S225. On the other hand, when the reliability status RS of the solid state drive SSDj is not greater than the first threshold TH1 ('No' direction), the procedure moves to operation S230.

In operation S225, the mapper 1214 may allocate the data protection method of the solid state drive SSDj to the first erasure coding set (EC0 set). The first erasure coding EC0 set may be a data protection method in which all SSDs included in the storage system 1200 are initially assigned as default values. Data or stripes that are divided and stored in SSDs included in the first erasure coding EC0 set may include the relatively fewest number of parity symbols. That is, the first erasure coding set may be an erasure coding set where the first coding rate 'n/(n+k)=R0' indicating the length of the message symbol with respect to the length (n+k) of the coded symbols is the largest.

In operation S230, the device status monitor 1212 may determine whether the reliability status RS of the solid state drive SSDj is greater than a second threshold value TH2 and less than or equal to a first threshold value TH1. If the reliability status RS of the solid state drive SSDj is greater than the second threshold value TH2 and less than or equal to the first threshold value TH1 ('Yes' direction), the procedure moves to operation S235. On the other hand, if the reliability status RS of the solid state drive SSDj is not greater than the second threshold ('No' direction), the procedure moves to operation S240.

In operation S235, the mapper 1214 may allocate the data protection method of the solid state drive SSDj to the second erasure coding set (EC1 set). Data or stripes stored in the SSDs allocated to the second erasure coding EC1 set may have a second coding rate 'R1' that is smaller than the first coding rate 'R0'. That is, the second erasure coding EC1 set may be an erasure coding set where the ratio of parity symbols among all symbols is greater than that of the first erasure coding EC0 set, or stated differently more parity symbols 'k' may be used for a given set of 'n' symbol units in the second erasure coding EC1 set than in the first erasure coding EC0 set. Accordingly, as the reliability status RS decreases, data reliability may be improved to some extent even if performance is slightly reduced by applying the second erasure coding EC1 set.

In operation S240, the device status monitor 1212 may determine whether the reliability status RS of the solid state drive SSDj is greater than a third threshold value TH3 and less than or equal to a second threshold value TH2. If the reliability status RS of the solid state drive SSDj is greater than the third threshold value TH3 and less than or equal to the second threshold value TH2 ('Yes' direction), the procedure moves to operation S245. On the other hand, when the reliability status RS of the solid state drive SSDj is not greater than the third threshold ('No' direction), the procedure moves to operation S250.

In operation S245, the mapper 1214 may allocate the data protection method of the solid state drive SSDj to the third erasure coding EC2 set. Data or stripes stored in SSDs allocated to the third erasure coding EC2 set may have a third coding rate 'R2' that is smaller than the second coding rate 'R1'. That is, the third erasure coding EC2 set has a relatively higher parity ratio than that of the second erasure coding EC1 set. Accordingly, as the reliability status RS decreases, data reliability may be improved to some extent even though performance is slightly reduced by applying the third erasure coding EC2 set.

In operation S250, the mapper 1214 may exclude the data protection method of the solid state drive SSDj from the multi-level erasure coding sets. That is, if the SSDs excluded from the appropriate number of erasure coding sets are satisfied in the future, the data protection method will be changed to the replication REP method.

In the above discussion of FIG. 9, a method of managing SSDs with the erasure coding EC set corresponding to different code rates or data lengths according to the level of the reliability status RS has been described. By using such a multi-level erasure coding set, a more flexible data protection scheme against a change in the reliability status RS may be applied to the SSD.

Figure 10:
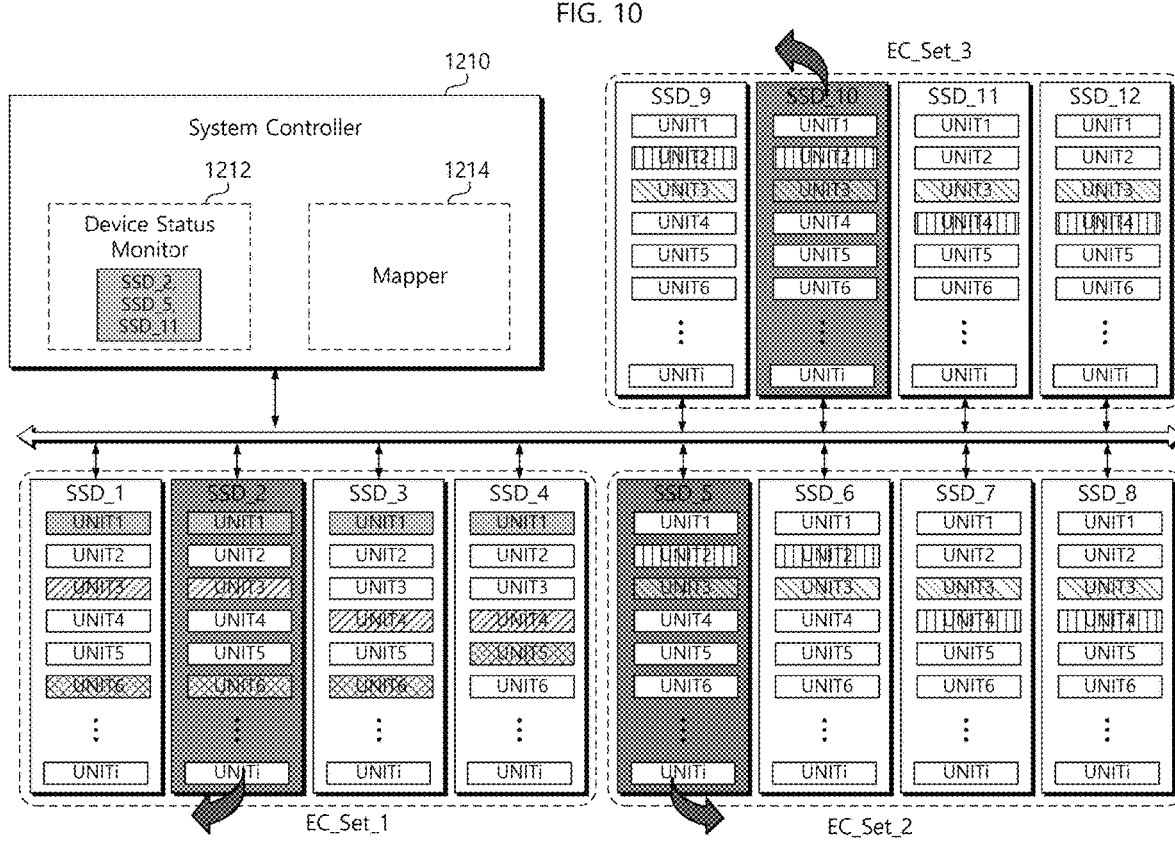
FIG. 10 is a diagram illustrating an example of checking a reliability status by the system controller of the present inventive concepts and changing the data protection method of the solid state drive accordingly.

FIG. 10 is a diagram illustrating an example of checking the reliability status by the system controller of the present inventive concepts and changing the data protection method of the solid state drive accordingly. Referring to FIG. 10, the mapper 1214 may manage all SSDs (e.g., SSD_1 to SSD_12) by the erasure coding EC method until reliability degradation is detected by the device status monitor 1212. In addition, it is assumed in the example of FIG. 10 that reliability degradation has been detected in three SSDs (e.g., SSD_2, SSD_5, and SSD_10) by the device status monitor 1212.

The solid state drive SSD_2 for which reliability degradation has been detected was included in the first erasure coding set EC_Set_1. However, if the device status monitor 1212 detects that the reliability is lowered below the reference value, the solid state drive SSD_2 may now be excluded from the first erasure coding set EC_Set_1.

Here, the exclusion of the solid state drive SSD_2 from the first erasure coding set EC_Set_1 may result in the solid state drive SSD_2 being excluded from the first erasure coding set EC_Set_1 during a write operation of new data. On the other hand, data that has already been written to the solid state drive SSD_2 and managed in units of stripes may still be regarded as data of the first erasure coding set EC_Set_1. That is, during a read operation on the solid state drive SSD_2, the qualification as the first erase coding set EC_Set_1 is still maintained.

Similarly, the solid state drive SSD_5 for which reliability degradation was detected was included in the second erasure coding set EC_Set_2. However, when the device status monitor 1212 detects that the reliability is lowered below the reference value, the solid state drive SSD_5 may subsequently be excluded from the second erasure coding set EC_Set_2. That the solid state drive SSD_5 is excluded from the second erasure coding set EC_Set_2 may mean that the solid state drive SSD_5 is excluded from the second erasure coding set EC_Set_2 during a write operation of new data, while data that has already been written to the solid state drive SSD_5 and managed in units of stripes may still be regarded as data of the second erasure coding set EC_Set_2. That is, during a read operation on the solid state drive SSD_5, the qualification as the second erasure coding set EC_Set_2 may still be maintained.

The solid state drive SSD_10 for which reliability degradation was detected was included in the third erasure coding set EC_Set_3. However, if the device status monitor 1212 detects that the reliability is lower than the reference value, the solid state drive SSD_10 may be excluded from the third erasure coding set EC_Set_3. The exclusion of the solid state drive SSD_10 from the third erasure coding set EC_Set_3 may mean that the solid state drive SSD_10 is excluded from the third erasure coding set EC_Set_3 during a write operation of new data, while data that has already been written to the solid state drive SSD_10 and managed in units of stripes may still be regarded as data of the third erasure coding set EC_Set_3. That is, during a read operation on the solid state drive SSD_10, the qualification as the third erasure coding set EC_Set_3 may still be maintained.

Here, the solid state drives SSD_2, SSD_5, and SSD_10 may maintain a state excluded from the erasure coding sets EC_Set_1, EC_Set_2, and EC_Set_3 for a predetermined time, respectively. This is because at least two or more solid state drives must be provided to configure a replication REP set for operating a data protection method as a replication REP method. For example, the replication REP set for operating the data protection method in the replication REP method should consist of three solid state drives, at least three solid state drives (SSD_2, SSD_5, SSD_10) may be excluded from the erasure coding sets (EC_Set_1, EC_Set_2, EC_Set_3) before a replication REP set may be assembled. Accordingly, in the example of FIG. 10, once the solid state drives SSD_2, SSD_5, and SSD_10 are excluded from the respective erasure coding sets EC_Set_1, EC_Set_2, and EC_Set_3, a new replication REP set that includes the solid state drives SSD_2, SSD_5, and SSD_10 may be formed. These features will be described in more detail with reference to FIG. 11 to be described later.

Figure 11:
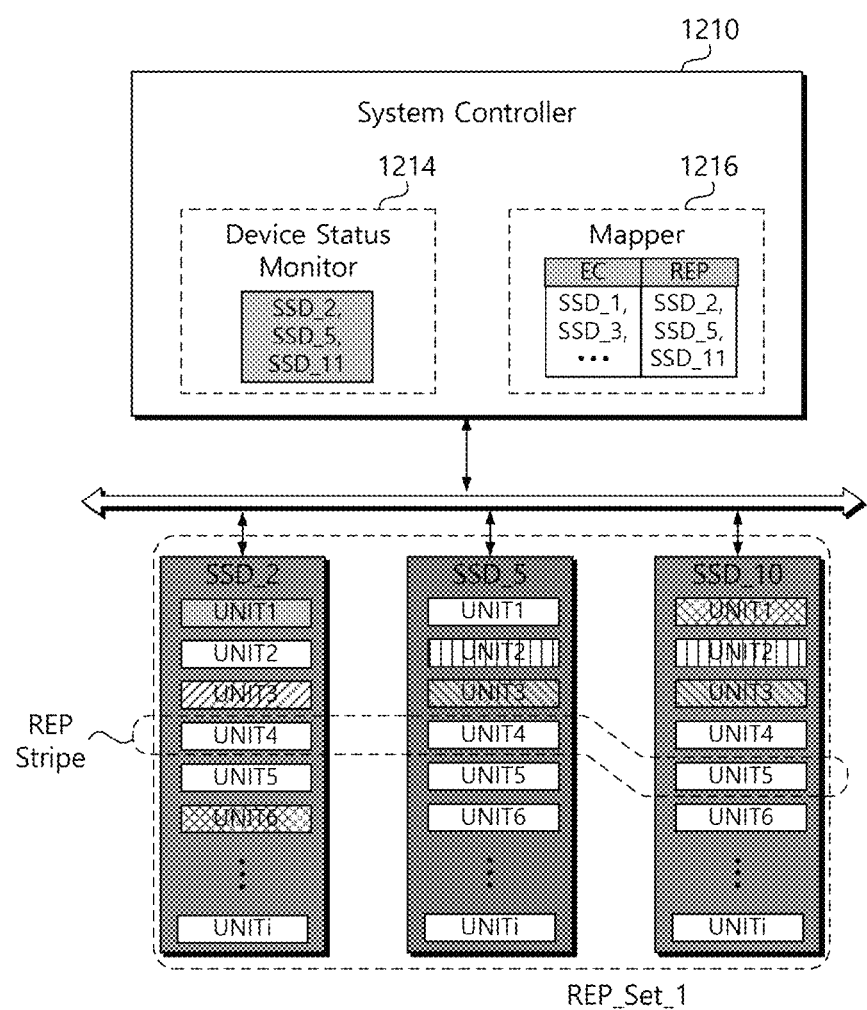
FIG. 11 is a diagram illustrating solid state drives managed by a replication (REP) method by configuring a new replication set (REP set).

FIG. 11 is a diagram illustrating solid state drives managed by a replication REP method by configuring a new replication REP set. FIG. 11 continues the example from FIG. 10. Referring to FIG. 11, each of the three solid state drives (SSD_2, SSD_5, SSD_10) excluded from the erasure coding sets (EC_Set_1, EC_Set_2, EC_Set_3) may be used to form a new first replication set REP_Set_1.

The mapper 1214 may collect indicators of a number (e.g., three) SSDs (e.g., SSD_2, SSD_5, SSD_10) that are respectively excluded from the erasure coding sets (e.g., EC_Set_1, EC_Set_2, EC_Set_3) when reliability degradation is detected. The mapper 1214 may allocate the collected SSDs SSD_2, SSD_5, and SSD_10 to the first replication set REP_Set_1. However, valid data may still be stored in the symbols (or chunks) of the SSDs SSD_2, SSD_5, and SSD_10 that are allocated to the first replication set REP_Set_1. For example, the units UNIT1, UNIT3, and UNIT6 of the solid state drive SSD_2 may form a valid stripe with other SSDs of the first erasure coding sets EC_Set_1. Accordingly, the units UNIT1, UNIT3, and UNIT6 of the solid state drive SSD_2 may be managed by erasing coding when a read request is received. Similarly, the units UNIT2 and UNIT3 of the solid state drive SSD_5 also maintain a stripe configuration with other SSDs of the second erasure coding sets EC_Set_2. Further, the units UNIT1, UNIT2, and UNIT3 of the solid state drive SSD_10 may also maintain a stripe configuration with other SSDs of the third erasure coding sets EC_Set_3.

Accordingly, during a read operation of the three solid state drives SSD_2, SSD_5, and SSD_10 constituting the new first replica set REP_Set_1, each erase coding set may still be maintained. On the other hand, when a write request to the three solid state drives SSD_2, SSD_5, and SSD_10 constituting the new first replication set REP_Set_1 occurs, a replication REP stripe composed of three units is selected. For example, the write-requested data may be stored in the unit UNIT4 of the solid state drives SSD_2 with the original symbol, and duplicate symbols may be stored in the units UNIT4 and UNIT5 of the solid state drives SSD_5 and SSD_10, respectively.

Figure 12:
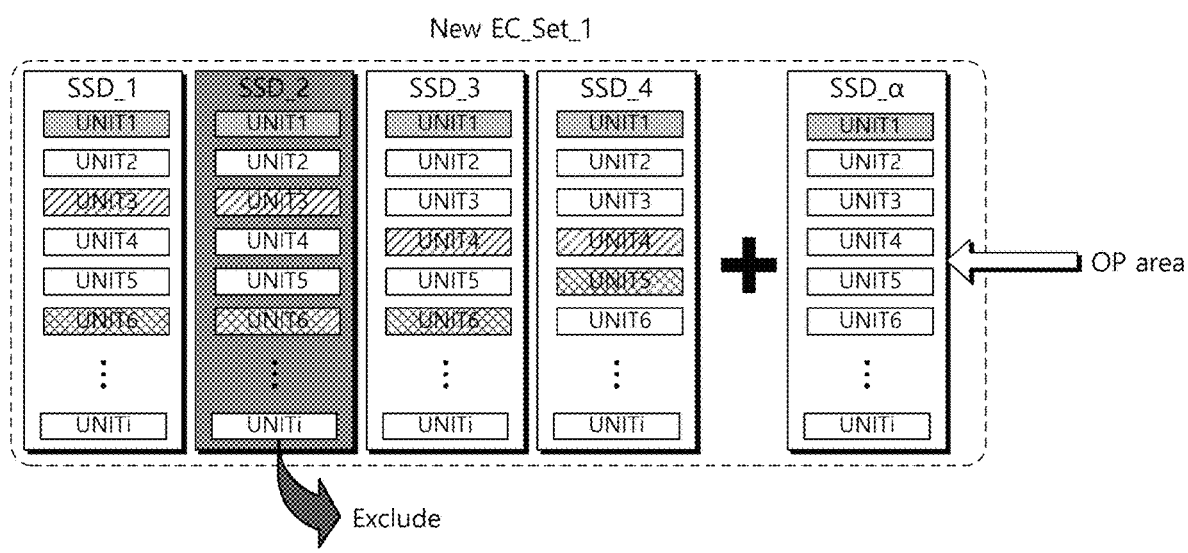
FIGS. 12 to 13 are diagrams illustrating a method of selecting a new SSD to replace an SSD excluded from an erasure coding set.
Figure 13:
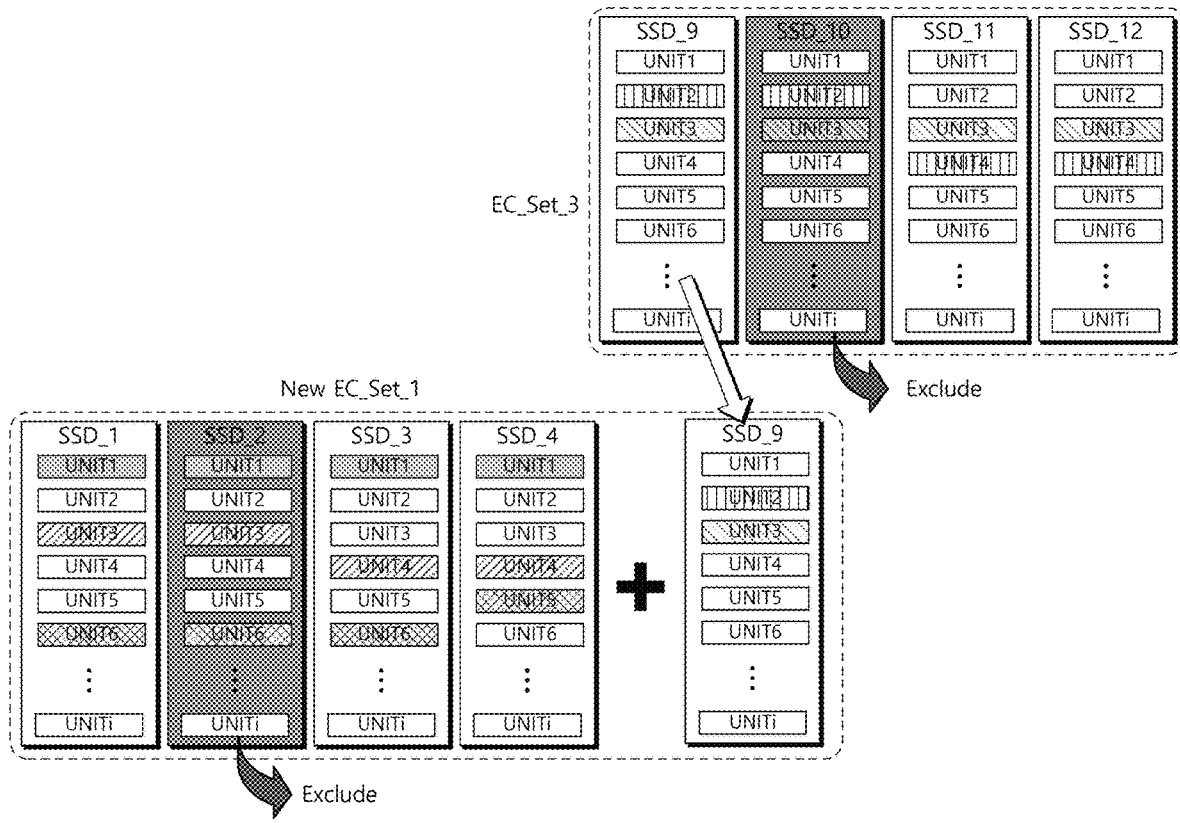

FIGS. 12 to 13 are diagrams illustrating a method of selecting a new SSD to replace an SSD excluded from an erasure coding set. Referring to FIG. 12, according to the exclusion of the solid state drive SSD_2 from the first erasure coding set EC_Set_1, a new solid state drive SSD_α may be added to configure a new first erasure coding set New EC_Set_1.

The solid state drive SSD_α may be a solid state drive SSD initially allocated to an over-provisioning area (OP area). When a write request is generated according to the configuration of the new first erasure coding set New EC_Set_1, data is divided into the solid state drives SSD_1, SSD_3, SSD_4, and SSD_α to be written. In some embodiments, the solid state drive SSD_α may be provided by utilizing a reserved solid state drive (Reserved SSD).

Referring to FIG. 13, a new first erasure coding set (New EC_Set_1) may be configured by adding a solid state drive of a different erasure coding set (e.g., SSD_9 of the third erasure coding set (EC_Set_3)). The solid state drive SSD_2 whose reliability degradation has been detected by the mapper 1214 may be excluded from the first erase coding set EC_Set_1. Therefore, in order to configure the new first erasure coding set New EC_Set_1, there may be a need for a device to replace the solid state drive SSD_2. In this case, the solid state drive SSD_9 from the third erasure coding set EC_Set_3 may be used.

After the solid state drive SSD_9 is allocated as the new first erasure coding set New EC_Set_1, it may be used as the third erasure coding set EC_Set_3 for a certain or predetermined period of time. For example, the units UNIT2 and UNIT3 of the solid state drive SSD_9 may correspond to stripes that were configured at a time point when the solid state drive SSD_9 was mapped to the third erasure coding set EC_Set_3. Accordingly, when a read request for the units UNIT2 and UNIT3 of the solid state drive SSD_9 occurs, these units are managed as if they are mapped to the third erasure coding set EC_Set_3.

On the other hand, when a write request for the new first erasure coding set New EC_Set_1 occurs, data must be divided and stored in the solid state drives SSD_1, SSD_3, SSD_4, and SSD_9. In this case, empty units of the solid state drive SSD_9 may be provided as stripes of the new first erasure coding set New EC_Set_1.

In the above, the mapping method constituting the new erasure coding set has been briefly described. However, in addition to the above-described embodiments, various methods may be used to select a new SSD to replace the excluded SSD.

The above are specific examples of embodiments for carrying out the present inventive concepts. In addition to the above-described example embodiments, the present inventive concepts may encompass embodiments having simple design changes from those embodiments provided herein. In addition, the present inventive concepts include techniques that can be easily modified and implemented using the description of various embodiments provided herein. Therefore, the scope of the present inventive concepts should not be limited to the above-described embodiments, and should be defined by the claims and equivalents of the claims of the present inventive concepts as provided herein.

What is claimed is:

1. A method of operating a storage system, the storage system including a plurality of solid state drives, and the method comprising:
   configuring the plurality of solid state drives into an erasure coding set and applying erasure coding to the erasure coding set;
   monitoring a reliability status of each of the plurality of solid state drives;
   selecting, from among the plurality of solid state drives of the erasure coding set, at least one solid state drive having a reliability status that is lower than a threshold value, the reliability status being lower than the threshold value indicating that the at least one solid state drive has degraded reliability;
   excluding the at least one solid state drive from the erasure coding set based on the reliability status of the at least one solid state drive being lower than the threshold value;

reconfiguring the erasure coding set by replacing the at least one solid state drive excluded from the erasure coding set with a different solid state drive;

constructing a replication set that includes the at least one solid state drive excluded from the erasure coding set and applying a replication method of data protection to the replication set, and mapping the erasure coding set and the replication set into a valid stripe associated with the erasure coding and a replication stripe associated with the replication method, wherein the valid stripe comprises a first portion of the erasure coding set and a first portion of the replication set, and wherein the replication stripe comprises only a second portion of the replication set.

2. The method of claim 1, wherein the reliability status of each of the plurality of solid state drives corresponds to a respective read latency of each of the plurality of solid state drives.

3. The method of claim 1, wherein the reliability status of each of the plurality of solid state drives corresponds to a respective number of read failures of each of the plurality of solid state drives.

4. The method of claim 1, wherein the constructing of the replication set is performed subsequently to a number of solid state drives that are excluded from the erasure coding set reaching a predetermined number.

5. The method of claim 4, wherein the constructing the replication set comprises:

storing original data in a memory unit of a first solid state drive of the replication set, and storing copy data of the original data in a memory unit of a second solid state drive of the replication set.

6. The method of claim 1, wherein the different solid state drive is taken from an over-provisioning area.

7. The method of claim 1, wherein the different solid state drive is taken from a different erasure coding set.

8. A storage system, comprising:

a plurality of solid state drives; and a system controller configured to group the plurality of solid state drives in sets and apply data protection to the sets, the sets including a first set in which an erasure coding method is applied to the solid state drives of the first set, and a second set in which a replication method is applied to the solid state drives of the second set, wherein the system controller is configured to monitor a reliability status of each of the plurality of solid state drives, and is configured to select at least one of the solid state drives of the first set having a reliability status that is lower than a reference value, exclude the selected at least one solid state drive from the first set, and allocate the selected at least one solid state drive to the second set, wherein the system controller is further configured to reconfigure the erasure coding set by replacing the at least one solid state drive excluded from the erasure coding set with a different solid state drive, wherein the reliability status of the selected at least one solid state drive of the first set being lower than the reference value indicates that the selected at least one solid state drive has degraded reliability, and wherein the system controller comprises a mapper configured to map the first set and the second set into a valid stripe associated with the erasure coding method and a replication stripe associated with the replication method, wherein the valid stripe comprises a first portion of the first set and a first portion of the second set, and wherein the replication stripe comprises only a second portion of the second set.

9. The storage system of claim 8, wherein the system controller is configured to detect a respective read latency of each of the plurality of solid state drives as part of being configured to monitor the reliability status.

10. The storage system of claim 8, wherein the system controller is configured to detect a respective number of read failures of each of the plurality of solid state drives as part of being configured to monitor the reliability status.

11. The storage system of claim 8, wherein the system controller comprises:

a device status monitor configured to monitor the reliability status of each of the plurality of solid state drives.

12. The storage system of claim 11, wherein the system controller comprises:

an erasure coding engine configured to perform the erasure coding method on at least one solid state drive mapped to the first set; and a replication engine configured to perform the replication method on at least one solid state drive mapped to the second set.

13. The storage system of claim 12, wherein the system controller comprises a network interface card configured to communicate with an external network.

14. A method of operating a storage system comprising:

configuring a plurality of solid state drives into a first set and applying an erasure coding data protection policy to the first set, the erasure coding data protection policy applied as a default data protection policy;

monitoring a reliability status of each of the plurality of solid state drives of the first set;

selecting, from among the plurality of solid state drives of the first set, at least one solid state drive having a reliability status that is lower than a threshold value, and excluding the selected at least one solid state drive from the first set, wherein the reliability status of the at least one solid state drive of the first set being lower than the threshold value indicates that the at least one solid state drive has degraded reliability;

reconfiguring the erasure coding set by replacing the at least one solid state drive excluded from the first set with a different solid state drive;

configuring a second set that includes the selected at least one solid state drive excluded from the first set and applying a replication data protection policy to the second set; and mapping the first set and the second set into a valid stripe associated with the erasure coding data protection policy and a replication stripe associated with the replication data protection policy, wherein the valid stripe comprises a first portion of the first set and a first portion of the second set, and wherein the replication stripe comprises only a second portion of the second set.

15. The method of claim 14, wherein the reliability status of each of the plurality of solid state drives corresponds to a respective read latency of each of the plurality of solid state drives.

16. The method of claim 14, wherein the reliability status of each of the plurality of solid state drives corresponds to a respective number of read failures of each of the plurality of solid state drives.

* * * * *